United States Patent
Ladd et al.

(10) Patent No.: US 8,800,298 B2
(45) Date of Patent: Aug. 12, 2014

(54) WASHER WITH COOLING PASSAGE FOR A TURBINE ENGINE COMBUSTOR

(75) Inventors: Scott A. Ladd, Coventry, CT (US); Kevin Joseph Low, Portland, CT (US)

(73) Assignee: United Technologies Corporation, Hartford, CT (US)

( * ) Notice: Subject to any disclaimer, the term of this patent is extended or adjusted under 35 U.S.C. 154(b) by 1413 days.

(21) Appl. No.: 12/505,025

(22) Filed: Jul. 17, 2009

(65) Prior Publication Data
US 2011/0011095 A1     Jan. 20, 2011

(51) Int. Cl.
F02C 3/10     (2006.01)

(52) U.S. Cl.
USPC .......................................................... 60/792

(58) Field of Classification Search
USPC .................................. 60/752–760, 796–800
See application file for complete search history.

(56) References Cited

U.S. PATENT DOCUMENTS

| | | |
|---|---|---|
| 2,069,402 A | 2/1937 | Cowlin |
| 2,282,360 A | 5/1942 | Horrocks |
| 3,332,464 A | 7/1967 | Castel |
| 4,366,640 A | 1/1983 | Clapp |
| 4,422,300 A | 12/1983 | Dierberger et al. |
| 5,129,231 A | 7/1992 | Becker et al. |
| 5,144,793 A | 9/1992 | Able et al. |
| 5,323,601 A * | 6/1994 | Jarrell et al. ..................... 60/796 |
| 5,413,193 A | 5/1995 | Miller |
| 5,435,139 A | 7/1995 | Pidcock et al. |
| 5,626,449 A | 5/1997 | McKinlay |
| 5,758,503 A | 6/1998 | DuBell et al. |
| 6,606,861 B2 | 8/2003 | Snyder |
| 6,701,714 B2 | 3/2004 | Burd et al. |
| 6,895,761 B2 | 5/2005 | Mitchell et al. |
| 6,904,757 B2 | 6/2005 | Mitchell et al. |
| 7,140,185 B2 | 11/2006 | Burd |
| 7,509,813 B2 | 3/2009 | Stastny |
| 7,721,522 B2 * | 5/2010 | Farah et al. ..................... 60/39.5 |
| 7,866,162 B2 * | 1/2011 | Blanchard et al. .............. 60/796 |
| 2004/0093872 A1 * | 5/2004 | Tiemann ........................ 60/796 |
| 2004/0118124 A1 * | 6/2004 | Tiemann et al. ................ 60/752 |
| 2007/0240423 A1 | 10/2007 | Bulman et al. |
| 2008/0264064 A1 | 10/2008 | Sze et al. |

FOREIGN PATENT DOCUMENTS

JP     62243944     10/1987

* cited by examiner

*Primary Examiner* — Phutthiwat Wongwian
*Assistant Examiner* — William Breazeal
(74) *Attorney, Agent, or Firm* — Kinney & Lange, P.A.

(57) ABSTRACT

A washer for a turbine engine combustor comprises a first surface, a second surface facing generally opposite from the first surface, a bore communicating through the first and second surfaces, and a cooling passage separate from the bore and communicating through the first and second surfaces.

20 Claims, 8 Drawing Sheets

WASHER WITH COOLING PASSAGE FOR A TURBINE ENGINE COMBUSTOR

BACKGROUND

Gas turbine engine combustors are generally subject to high thermal loads for prolonged periods of time. To alleviate the accompanying thermal stresses, the walls of the turbine combustor must be cooled to help increase the usable life of the turbine combustor components and therefore increase the reliability of the overall turbine engine.

An annular, impingement film cooled turbine combustor typically comprises a support shell and a set of temperature tolerant heatshield panels secured to the shell to protect the shell from hot combustion gases. A typical heatshield panel has a shield portion whose platform is rectangular or approximately rectangular. When secured to the shell, the shield is oriented substantially parallel to the shell so that one side of the heatshield, referred to as the hot side, faces the hot combustion gases and the other side, referred to as the cold side, faces toward the support shell. A principal advantage of a thermally decoupled turbine combustor is that the heatshield panels can thermally expand and contract independently of each other. This thermal independence improves turbine combustor durability by reducing thermally induced stresses. Examples of impingement film cooled, thermally decoupled turbine combustors may be found in U.S. Pat. Nos. 6,701,714, 6,606,861, and 7,140,185, commonly owned by the applicant.

Today's smaller, high efficiency turbine combustors require precise partitioning of airflow for efficiency, emissions, performance and operational requirements. This includes the objective of minimizing the volume of cooling airflow required to cool the turbine combustor, and tight control of that airflow to maximize cooling benefits for better thermal regulation of the turbine combustor components.

SUMMARY

In one aspect, a washer for a turbine engine combustor comprises a first surface, a second surface facing generally opposite from the first surface, a bore communicating through the first and second surfaces, and a cooling passage separate from the bore and communicating through the first and second surfaces.

In another aspect, a support assembly for a turbine engine combustor has a stud, a retainer attached to the stud, and a washer circumscribing the stud, the washer having a first surface with a protrusion extending from the first surface, an opposite second surface and a cooling passage communicating through the first and second surfaces.

In another aspect, a turbine combustor comprises a support shell having a mounting passage, a stud extending through the mounting passage, a retainer attached to the stud, and a washer surrounding the stud and positioned between the support shell and the retainer, the washer having a retainer bearing surface, a shell bearing surface, and a washer cooling passage in the washer communicating through the retainer bearing surface and the shell bearing surface.

DETAILED DESCRIPTION

Support assemblies for heat shields of a turbine combustor, may include a support structure such as a shell that contains a pattern of cooling passages for controlling the flow of cooling air such that it impinges upon and cools the heat shields or other supported components. However, these assemblies may also include components, such as studs, retainers, and washers, for example, that physically obstruct cooling passages or otherwise interfere with the controlled and even flow of cooling air. This may happen, for example, where a washer covers a surface area and creates a dead spot in the area where no cooling air can flow, or improperly seals against a surface leading to uncontrolled leakage of cooling air around the washer. In either scenario, precise partitioning of airflow for efficiency, emissions, performance and operational requirements are not satisfied, and thermal regulation of components is hindered. The washer described herein includes one or more cooling passages that ensure a controlled and uniform cooling of components supported by a support assembly.

Figure 1:
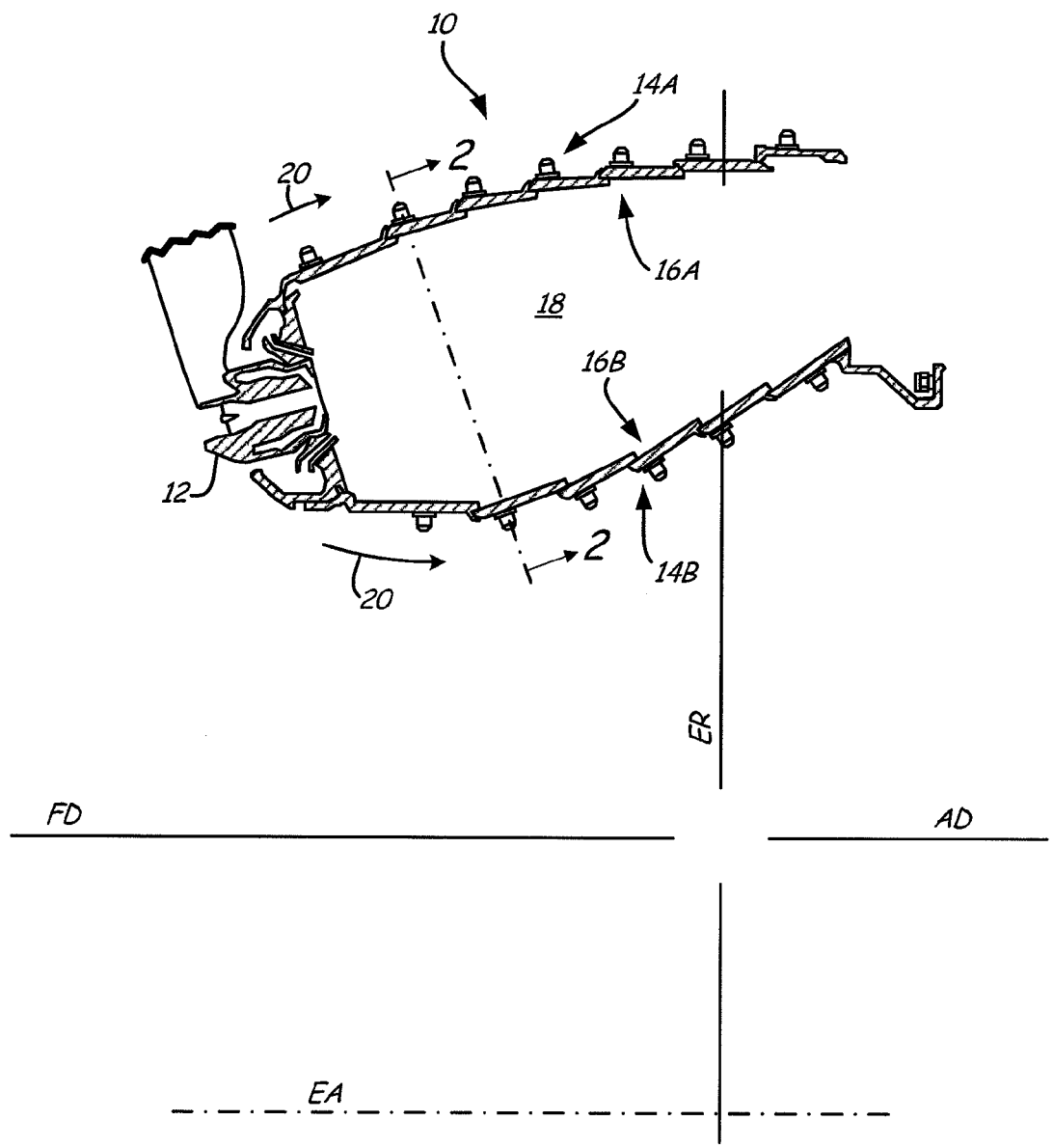
FIG. 1 is a cross section of an annular turbine combustor according to the present disclosure.

FIG. 1 shows a cross section of annular turbine combustor 10 including fuel nozzle 12, outer support assembly 14A, inner support assembly 14B, outer heat shield 16A, inner heat shield 16B, combustion chamber 18, and cooling air 20. Also shown for reference is the engine axis EA, engine radius ER, and forward direction FD and aft direction AD. Outer support assembly 14A, inner support assembly 14B, outer heat shield 16A, inner heat shield 16B all circumscribe the engine axis EA and cooperate with each other to define the annular combustion chamber 18. Outer support assembly 14A structurally supports the outer heat shield 16A, and inner support assembly 14B structurally supports the inner heat shield 16B, described in more detail with reference to FIG. 2. Outer heat shield 16A and inner heat shield 16B shield the heat generated in combustion chamber 18 during combustion of fuel from fuel nozzle 12. During operation of annular turbine combustor 10, compressed cooling air 20 travels around outer support assembly 14A and inner support assembly 14B. As shown in more detail with reference to FIG. 2, some of the cooling air 20 then travels through cooling passages 28A, 28B, 46A, and 46B in outer support assembly 14A, inner support assembly 14B, outer heat shield 16A and inner heat shield 16B, respectively, to provide for impingement and film cooling of outer heat shield 16A and inner heat shield 16B.

Figure 2:
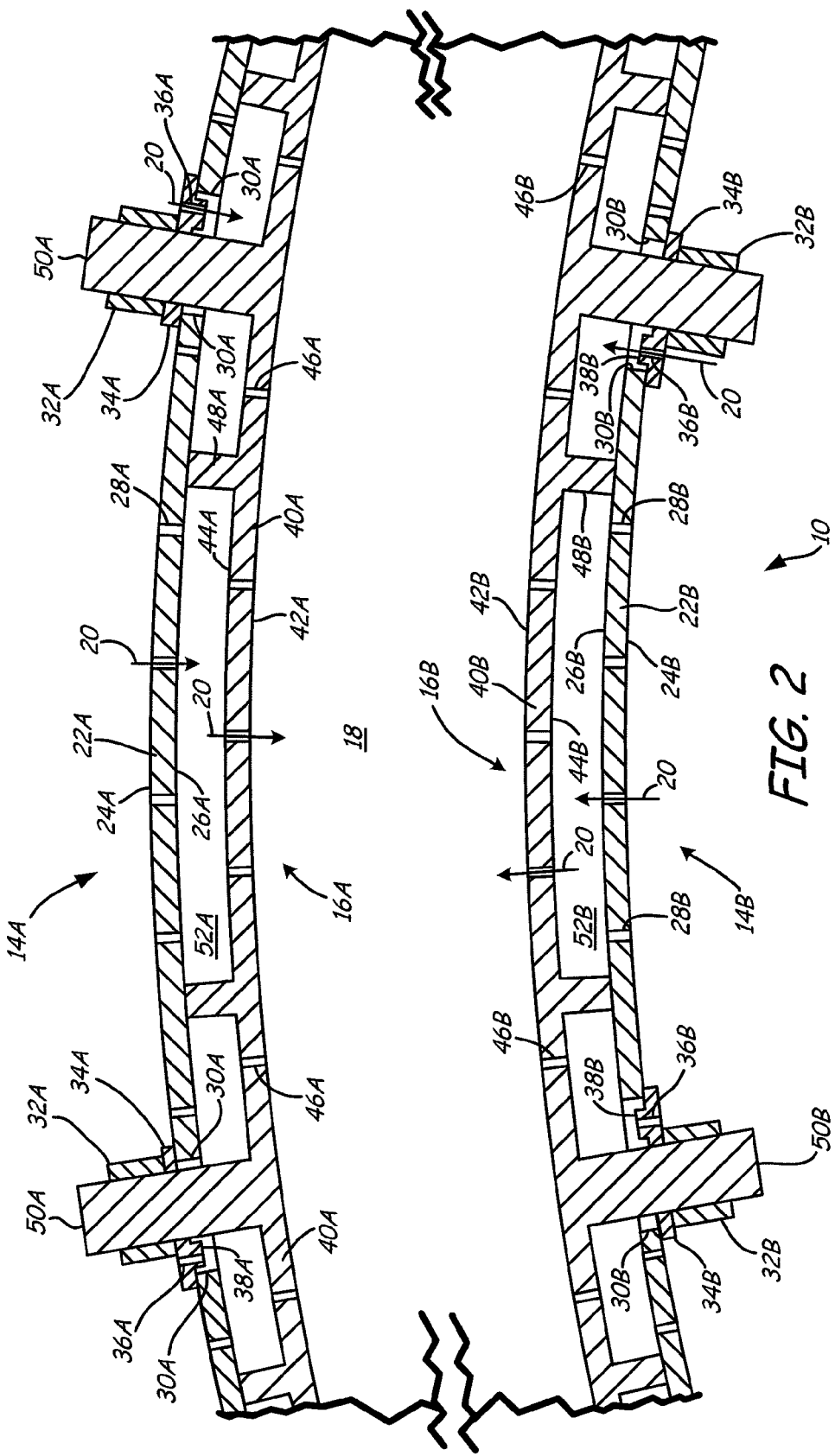
FIG. 2 is a partial cross section of the annular turbine combustor taken along line 2-2 of FIG. 1.

FIG. 2 is an aft-facing cross section 2-2 of annular turbine combustor 10 shown in FIG. 1, showing more detail of outer support assembly 14A, outer heat shield 16A, inner support assembly 14B and inner heat shield 16B. Shown in the top portion of FIG. 2 is outer support assembly 14A including support shell 22A having cold side 24A opposite hot side 26A, cooling passages 28A and mounting passages 30A extending through support shell 22A between cold side 24A and hot side 26A, retainer 32A for attaching to stud 50A, and washer 34A circumscribing stud 50A and positioned between retainer 32A and cold side 24A, washer 34A having washer cooling passage 36A and protrusion 38A extending into mounting passage 30A. Further shown in the top portion of FIG. 2 is outer heat shield 16A including heat shield panel 40A having hot side 42A opposite cold side 44A, cooling passages 46A extending through heat shield panel 40A between hot side 42A and cold side 44A, and non-penetrating projections 48A and studs 50A extending radially outward from cold side 44A with respect to engine axis EA. Further shown is cooling chamber 52A defined by the hot side 26A of support shell 22A and the cold side 44A of heat shield panel 40A.

As generally illustrated in FIG. 2, heat shield panel 40A of outer heat shield 16A is integral or formed as one uniform and homogeneous part with non-penetrating projections 48A and studs 50A extending radially outward from cold side 44A of heat shield panel 40A with respect to engine axis EA (shown in FIG. 1). Non-penetrating projections 48A contact hot side 26A of support shell 22A, thereby spacing heat shield panel 40A from support shell 22A and defining cooling chamber 52A therebetween. Studs 50A project through mounting passages 30A of support shell 22A to enable attachment to the outer support assembly 14A. Outer support assembly 14A includes washer 34A circumscribing each stud 50A. Washer 34A covers mounting passage 30A, and bears against cold side 24A of support shell 22A. Mounting passage 30A may be of a generally oblong shape (shown with reference to FIG. 3), and washer protrusion 38A projects into mounting passage 30A to align washer 34A in the proper direction with respect to mounting passage 30A. Mounting passage 30A is sized to permit receipt of both protrusion 38A and stud 50A, wherein protrusion 30A projects into mounting passage 30A in an inward radial direction and stud 50A projects through mounting passage 30A in an opposite outward radial direction with respect to engine axis EA. Mounting passage 30A is furthermore sized to allow for growth of stud 50A caused by thermal expansion during operation of annular turbine combustor 10. The oblong shape of mounting passage 30A facilitates the easy assembly of heat shield panel 40A with support shell 22A by providing room for play when aligning multiple studs 50A such that each stud fits through a respective mounting passage 30A. Retainers or nuts 32A are then threaded or otherwise attached to each stud 50A to bear against washers 34A and thus provide a biasing force for holding hot side 26A of support shell 22A against non-penetrating projections 48A, thereby securing the attachment of heat shield panel 40A to support shell 22A at the studs 50A and continuous radial alignment of heat shield panel 40A to support shell 22A at the projections 48A.

During operation of annular turbine combustor 10, cooling air 20 first passes over the cold side 24A of support shell 22A before proceeding through cooling passages 28A. Cooling air 20 then impinges on cold side 44A of heat shield panel 40A before passing through cooling passages 46A to provide air for film cooling of hot side 42A that faces and defines in-part combustion chamber 18. A tailored, uniform distribution of cooling passages 28A in support shell 28A ensures even impingement cooling of cold side 44A of heat shield panel 40A, in addition to precise partitioning of cooling air 20 into cooling chamber 52A. Cooling passage 36A located in washer 34A communicates with cooling chamber 52A to ensure the uniform distribution of cooling passages 28A in support shell 22A is not interrupted in the vicinity of studs 50A. By allowing cooling air 20 to travel through washer 34A and generally into cooling chamber 52A, a more uniform impingement cooling of cold side 44A of heat shield panel 40A is accomplished, as well as a more precise partitioning of cooling air 20 into cooling chamber 52A for film cooling purposes, for example.

Shown in the bottom portion of FIG. 2 is inner support assembly 14B including support shell 22B having cold side 24B opposite hot side 26B, cooling passages 28B and mounting passages 30B extending through support shell 22B between cold side 24B and hot side 26B, retainer 32B for attaching to stud 50B, and washer 34B circumscribing stud 50B and positioned between retainer 32B and cold side 24B, washer 34B having washer cooling passage 36B and protrusion 38B extending into mounting passage 30B. Further shown in the bottom portion of FIG. 2 is inner heat shield 16B including heat shield panel 40B having hot side 42B opposite cold side 44B, cooling passages 46B extending through heat shield panel 40B between hot side 42B and cold side 44B, and non-penetrating projections 48B and studs 50B extending radially inward from cold side 44B with respect to engine axis EA. Further shown is cooling chamber 52B defined by the hot side 26B of support shell 22B and the cold side 44B of heat shield panel 40B.

As generally illustrated in FIG. 2, heat shield panel 40B of inner heat shield 16B is integral or formed as one uniform and homogeneous part with non-penetrating projections 48B and studs 50B extending radially inward from cold side 44B of heat shield panel 40B with respect to engine axis EA. Non-penetrating projections 48B contact hot side 26B of support shell 22B, thereby spacing heat shield panel 40B from support shell 22B and defining cooling chamber 52B therebetween. Studs 50B project through mounting passages 30B of support shell 22B to enable attachment to the outer support assembly 14B. Inner support assembly 14B includes washer 34B circumscribing each stud 50B. Washer 34B covers mounting passage 30B, and bears against cold side 24B of support shell 22B. Mounting passage 30B may be of a generally oblong shape, and washer protrusion 38B projects into mounting passage 30B to align washer 34B in the proper direction with respect to mounting passage 30B. Mounting passage 30B is sized to permit receipt of both protrusion 38B and stud 50B, wherein protrusion 30B projects into mounting passage 30B in an outward radial direction and stud 50B projects through mounting passage 30B in an opposite inward radial direction with respect to engine axis EA. Mounting passage 30B is furthermore sized to allow for growth of stud 50B caused by thermal expansion during operation of annular turbine combustor 10. The oblong shape of mounting passage 30B facilitates the easy assembly of heat shield panel 40B with support shell 22B by providing room for play when aligning multiple studs 50B such that each stud fits through a respective mounting passage 30B. Retainers or nuts 32B are then threaded or otherwise attached to each stud 50B to bear against washers 34B and thus provide a biasing force for holding hot side 26B of support shell 22B against non-penetrating projections 48B, thereby securing the attachment of heat shield panel 40B to support shell 22B at the studs 50B and continuous radial alignment of heat shield panel 40B to support shell 22B at the projections 48B.

During operation of annular turbine combustor 10, cooling air 20 first passes over the cold side 24B of support shell 22B before proceeding through cooling passages 28B. Cooling air 20 then impinges on cold side 44B of heat shield panel 40B before passing through cooling passages 46B to provide air for film cooling of hot side 42B that faces and defines in-part combustion chamber 18. A tailored, uniform distribution of cooling passages 28B in support shell 28B is important for ensuring even impingement cooling of cold side 44B of heat shield panel 40B, in addition to precise partitioning of cooling air 20 into cooling chamber 52B. Washer cooling passage 36B communicates with cooling chamber 52B to ensure the uniform distribution of cooling passages 28B in support shell 22B is not interrupted in the vicinity of studs 50B. By allowing cooling air 20 to travel through washer 34B and generally into cooling chamber 52B, a more uniform impingement cooling of cold side 44B of heat shield panel 40B is accomplished, as well as a more precise partitioning of cooling air 20 into cooling chamber 52B for film cooling purposes, for example.

Figure 3:
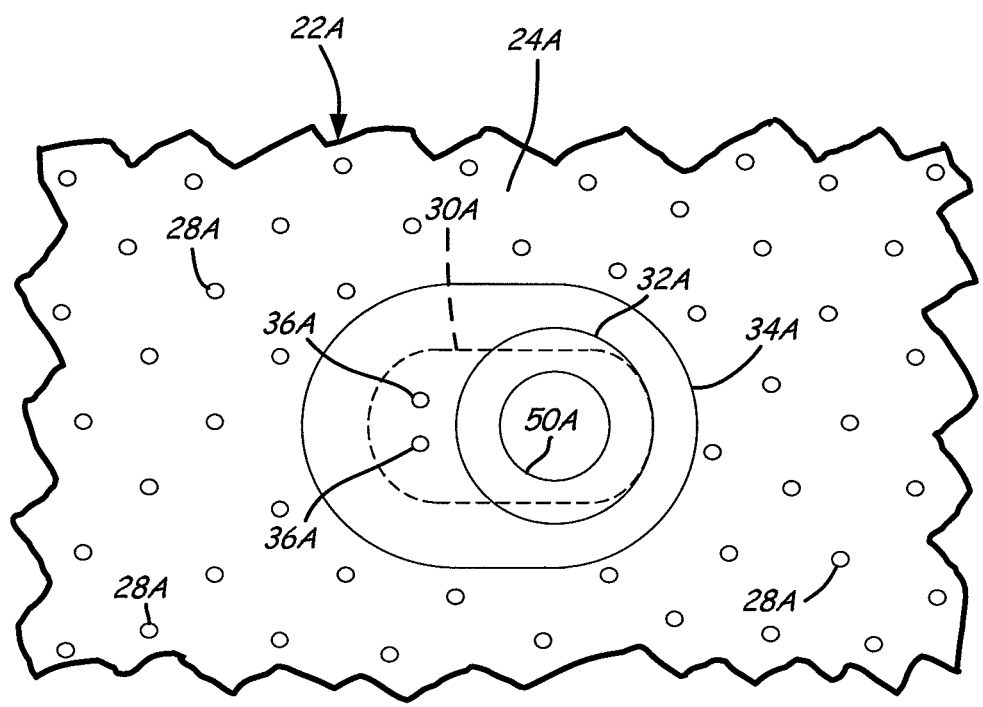
FIG. 3 is a plan view of a support assembly of the turbine combustor shown in FIG. 2.

FIG. 3 is a plan view of the top left portion of FIG. 2 showing cold side 24A of support shell 22A, including cooling passage 28A, washer 34A, retainer 32A, stud 50A, washer cooling passage 36A, and an outline of mounting passage 30A covered by washer 34A. It may be appreciated that a plan view of cold side 24B of support shell 22B would look the same, showing cooling passage 28B, washer 34B, retainer 32B, stud 50B, washer cooling passage 36B, and an outline of mounting passage 30B covered by washer 34B. Although two washer cooling passages 36A are shown, it may be appreciated that any number of cooling passages could be used to ensure a uniform distribution of cooling passages 28A in support shell 22A, for example. Furthermore, the precise location of one or more washer cooling passages 36A could be altered from what is shown in FIG. 3 in order to mimic a cooling passage 28A pattern.

Figure 4A:
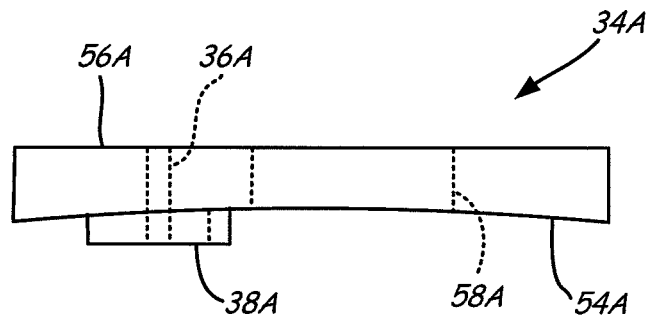
FIG. 4A is a profile view of a first washer shown in the top left portion of FIG. 2.
Figure 4B:
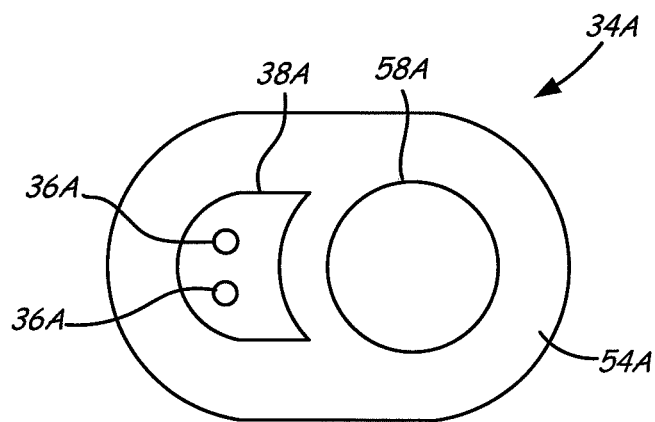
FIG. 4B is a bottom view of the first washer shown in FIG. 4A.

FIG. 4A is a profile view of washer 34A shown in the top left portion of FIG. 2, and FIG. 4B is a bottom view of the same washer, showing protrusion 38A, cooling passage 36A, shell bearing surface 54A, retainer bearing surface 56A, and bore 58A. In this embodiment, washer cooling passage 36A extends through washer protrusion 38A. Shell bearing surface 54A comprises an arcuate surface profile, for example, concave, to conform to the convex surface profile of cold side 24A of support shell 22A (shown in FIG. 2). By providing a conforming shell bearing surface 54A of washer 34A, a tight seal is created between washer 34A and cold side 24A of outer support shell 22A, thereby preventing uncontrolled leakage of cooling air 20 around bore 58A. In contrast to shell bearing surface 54A, retainer bearing surface 56A comprises a substantially planar surface to allow retainer or nut 32A to uniformly bear against the washer 34A, forming a tight seal between retainer 32A and washer 34A. Washer protrusion 38A ensures proper alignment of washer 34A when placed over mounting passage 30A, and further ensures washer coolant hole 36A comes into communication with cooling chamber 52A to allow cooling air 20 to pass into cooling chamber 52A and impinge upon cold side 44A of outer heat shield panel 40A (shown in FIG. 2).

Figure 5A:
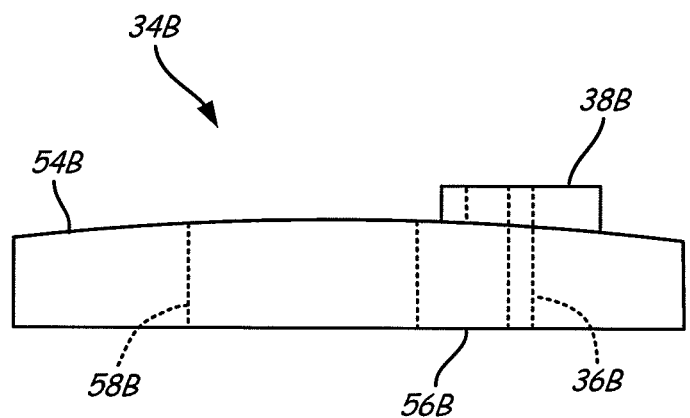
FIG. 5A is a profile view of a second washer shown in the bottom left portion of FIG. 2.
Figure 5B:
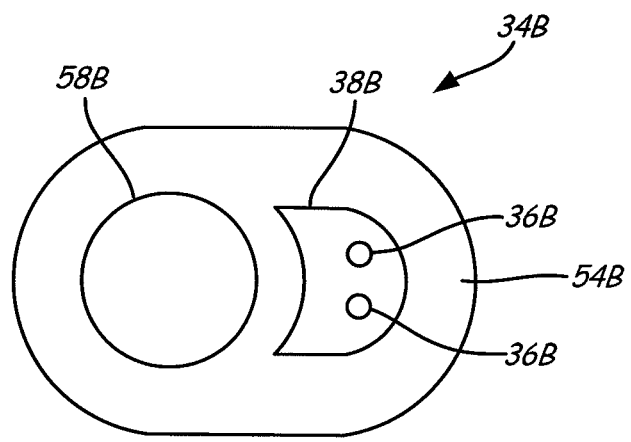
FIG. 5B is a top view of the second washer shown in FIG. 5A.

FIG. 5A is a profile view of washer 34B shown in the bottom left portion of FIG. 2, and FIG. 5B is a top view of the same washer, showing protrusion 38B, cooling passage 36B, shell bearing surface 54B, retainer bearing surface 56B, and bore 58B. In this embodiment, washer cooling passage 36B extends through washer protrusion 38B. Shell bearing surface 54B comprises an arcuate surface profile, for example, convex, to conform to the concave surface profile of cold side 24B of inner support shell 22B shown in FIG. 2. By providing a conforming shell bearing surface 54B of washer 34B, a tight seal is created between washer 34B and cold side 24B of support shell 22B, thereby preventing uncontrolled leakage of cooling air 20 around bore 58B, forcing it to pass in a controlled manner through washer cooling passage 36B instead. In contrast to shell bearing surface 54B, retainer bearing surface 56B comprises a substantially planar surface to allow retainer 32B to uniformly bear against the washer, forming a tight seal between retainer 32B and washer 34B. Washer protrusion 38B ensures proper alignment of washer 34B when placed over mounting passage 30B, and further ensures washer coolant hole 36B comes into communication with cooling chamber 52B to allow cooling air 20 to pass into cooling chamber 52B and impinge upon cold side 44B of inner heat shield panel 40B (shown in FIG. 2).

Figure 6A:
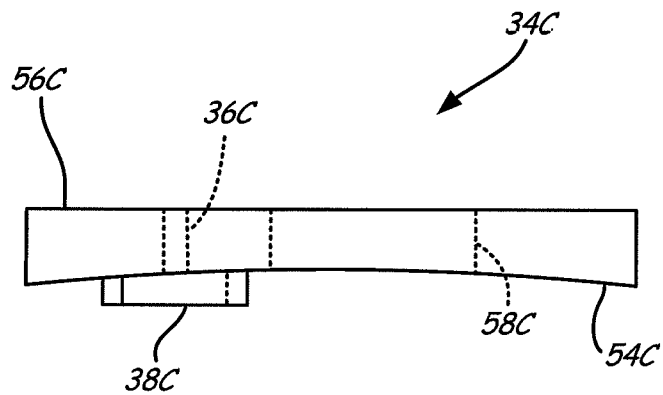
FIG. 6A is a profile view of an alternative embodiment of the first washer.
Figure 6B:
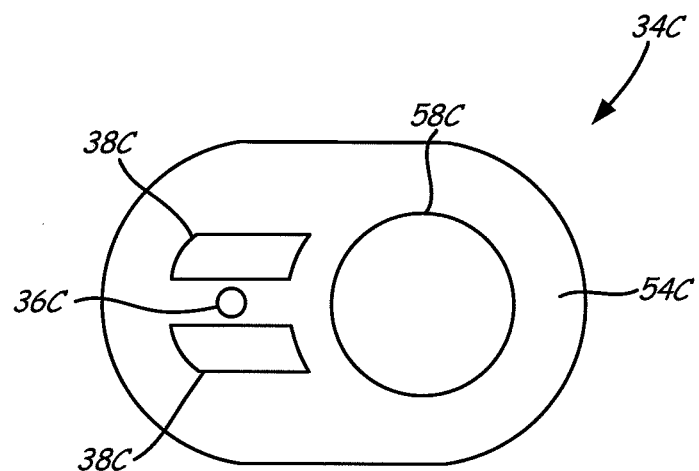
FIG. 6B is a bottom view of the first washer shown in FIG. 6A.

FIG. 6A is a profile view of an alternative embodiment of a washer 34C shown in an orientation suitable for the top left portion of FIG. 2, for example, and FIG. 6B is a bottom view of the same washer, showing protrusion 38C, cooling passage 36C, shell bearing surface 54C, retainer bearing surface 56C, and bore 58C. In this embodiment, washer cooling passage 36C does not extend through washer protrusion 38C. This may be beneficial in that cooling air 20 passing through cooling passage 36C will not experience as much of a pressure drop across washer 34C as that experienced across washer 34A, for example, due to the shorter cooling passage length. Although only one washer cooling passage 36C is shown, it may be appreciated that any number of cooling passages could be used to ensure a uniform distribution of cooling passages 28A in support shell 22A, for example.

Figure 7A:
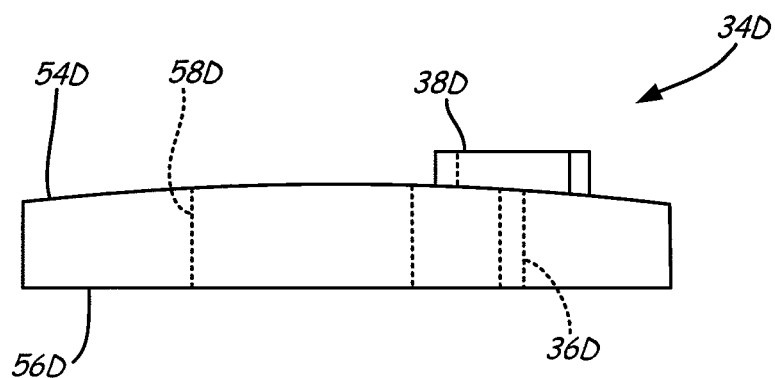
FIG. 7A is a profile view of an alternative embodiment of the second washer.
Figure 7B:
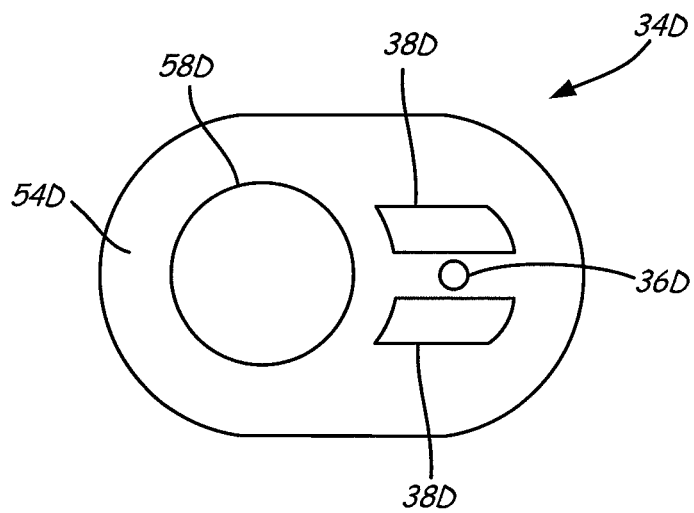
FIG. 7B is a top view of the second washer shown in FIG. 7A.

FIG. 7A is a profile view of an alternative embodiment of a washer 34D shown in an orientation suitable for the bottom left portion of FIG. 2, for example, and FIG. 7B is a top view of the same washer, showing protrusion 38D, cooling passage 36D, shell bearing surface 54D, retainer bearing surface 56D, and bore 58D. In this embodiment, washer cooling passage 36D does not extend through washer protrusion 38D. This may be beneficial in that cooling air 20 passing through cooling passage 36D will not experience as much of a pressure drop across washer 34D as that experienced across washer 34B, for example, due to the shorter cooling passage length. Although only one washer cooling passage 36C is shown, it may be appreciated that any number of cooling passages could be used to ensure a uniform distribution of cooling passages 28A in support shell 22A, for example.

Figure 8:
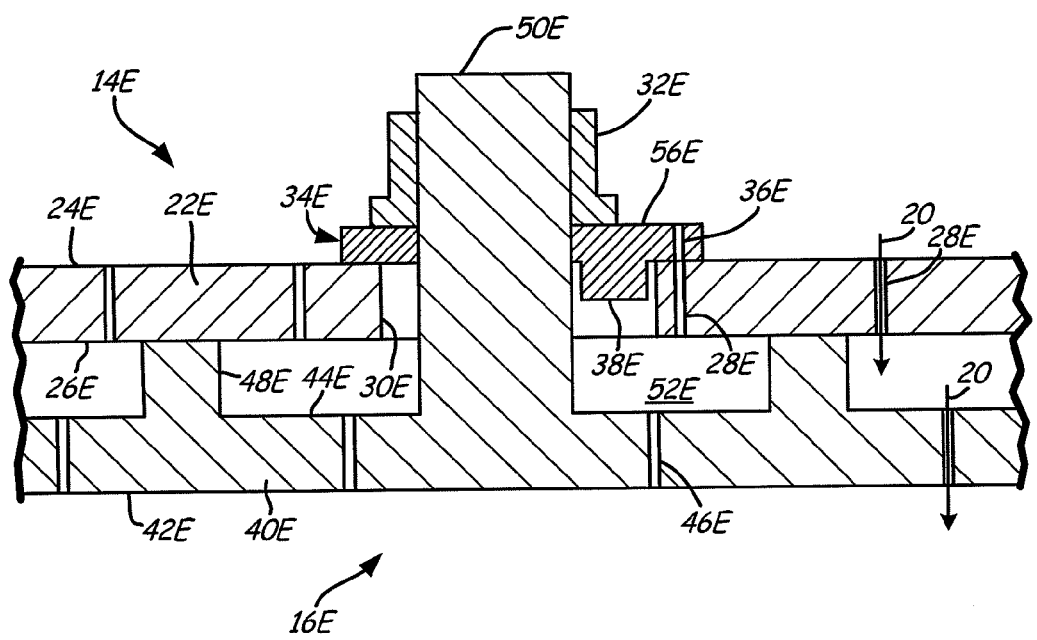
FIG. 8 is a partial aft facing cross section of an annular turbine combustor showing an additional washer embodiment.

FIG. 8 is an aft-facing cross section of the annular turbine combustor 10 of FIG. 1, showing an alternative embodiment of the present disclosure, with support assembly 14E including support shell 22E having cold side 24E opposite hot side 26E, cooling passages 28E and mounting passages 30E extending through support shell 22E between cold side 24E and hot side 26E, retainer 32E for attaching to stud 50E, and washer 34E circumscribing stud 50E and positioned between retainer 32E and cold side 24E, washer 34E having washer cooling passage 36E, protrusion 38E extending into mounting passage 30E, and retainer bearing surface 56E. Further shown is heat shield 16E including heat shield panel 40E having hot side 42E opposite cold side 44E, cooling passages 46E extending through heat shield panel 40E between hot side 42E and cold side 44E, and non-penetrating projections 48E and studs 50E extending from cold side 44E. Further shown is cooling chamber 52E defined by the hot side 26E of support shell 22E and the cold side 44E of heat shield panel 40E. Support assembly 14E may correspond to either outer support assembly 14A or inner support assembly 14B shown in FIG. 1, and heat shield 16E may correspond to either outer heat shield 16A or inner heat shield 16B of FIG. 1.

Heat shield panel 40E of inner heat shield 16E is integral with two or more non-penetrating projections 48E and studs 50E extending radially from cold side 44E of heat shield panel 40E. Non-penetrating projections 48E contact hot side 26E of support shell 22E, thereby spacing heat shield panel 40E from support shell 22E and defining cooling chamber 52E therebetween. Stud 50E projects through mounting passage 30E of support shell 22E to enable attachment to the support assembly 14E. Support assembly 14E includes washer 34E circumscribing stud 50E. Washer 34E covers mounting passage 30E, and bears against cold side 24E of support shell 22E. Mounting passage 30E may be of a generally oblong shape, and washer protrusion 38E extends into mounting passage 30E to align washer 34E in the proper direction with respect to mounting passage 30E. Retainer or nut 32E is then threaded onto or otherwise attached to stud 52E to bear against washer 34E and provide biasing force for holding hot side 26E of support shell 22E against non-penetrating projections 48E, thereby securing the attachment of heat shield panel 40E to support shell 22E at the studs 50E and continuous radial alignment of heat shield panel 40E to support shell 22E at the projections 48E.

During operation of annular turbine combustor 10, cooling air 20 first passes over the cold side 24E of support shell 22E before proceeding through cooling passages 28E. Cooling air 20 then impinges on cold side 44E of heat shield panel 40E before passing through cooling passages 46E to provide air for film cooling of hot side 42E facing combustion chamber 18. A uniform distribution of cooling passages 28E in support shell 28E is important for ensuring even impingement cooling of cold side 44E of heat shield panel 40E, in addition to precise partitioning of cooling air 20 into cooling chamber 52E. In situations where washer 34E may overlap a cooling passage 28E, washer 34E is provided with washer cooling passage 36E to communicate with the overlapped cooling passage 28E and ensure the flow of cooling air 20 is not interrupted in the vicinity of stud 50E. Washer protrusion 38E furthermore ensures proper alignment of washer cooling passage 36E with cooling passage 38E in support shell 22E.

Figure 9:
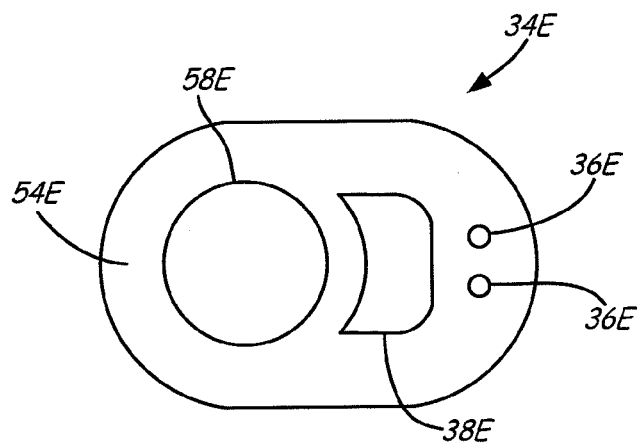
FIG. 9 is a bottom view of the washer shown in FIG. 8.

FIG. 9 is a bottom view of washer 34E shown in FIG. 8, showing washer cooling passage 36E, washer protrusion 38E located separately from cooling passage 36E, bore 58E, and shell bearing surface 54E. Washer protrusion 38E functions to properly align washer 34E with its mounting passage 30E by preventing it from rotating circumferentially, for example, and ensuring washer cooling passage 36E communicates with cooling passage 28E in support shell 22E. Although washer protrusion 38E functions as a guide or indexing feature to keep washer 34E circumferentially aligned in mounting passage 30E, it may also be appreciated that cold side 24E of support shell 22E could comprise a protrusion for protruding into a hole or concavity in washer 34E, thereby serving the same indexing function.

Washers 34A-34E described in the present disclosure are preferably made of an alloy capable of withstanding extreme temperatures, for example, nickel alloy or cobalt alloy, although other suitable materials could be used. It may be appreciated that the angle of washer cooling passages 36A-36E relative to shell bearing surface 54A-54E and retainer bearing surface 56A-56E, or more generally, a first surface and second surface of washer 32A-32E, may be varied to deliver cooling air to a desired location on heat shield panel 40A, 40B and 40E, for example. Although washers 32A-32E have been shown having a generally oblong shape, other shapes may be suitable including round shapes to cover round mounting passages 30A, 30B and 30E, for example. It may be also be appreciated that retainers 32A, 32B and 32E may include nuts, clips, or other retaining means suitable for bearing against washers 32A-32E and providing the appropriate force to hold support assemblies 14A, 14B and 14E to heat shields 16A, 16B, and 16E, respectively.

While the invention is described with reference to the exemplary embodiments, it is now understood by those skilled in the art that various changes may be made and equivalents may be substituted for elements thereof without departing from the scope of the invention. In addition, many modifications may be made to adapt a particular situation or material to the teachings of the invention without departing from the essential scope thereof. For example, it may be appreciated that the washers described in the present disclosure may also be applied to non-annular industrial gas turbine combustors. It should further be understood that the indexing feature (e.g., protrusion 38A and mounting passage 30A) generally carried between the washer and support shell may be reversed. Therefore, it is intended that the invention not be limited to the particular embodiment(s) disclosed, but that the invention will include all embodiments falling within the scope of the appended claims.

The invention claimed is:

1. A turbine combustor comprising:
a support shell having a hot side, a cold side, and a mounting passage;
a stud extending through the mounting passage;
a retainer attached to the stud on the cold side of the support shell; and
a washer surrounding the stud and positioned between the support shell and the retainer and in contact with both the support shell and the retainer, the washer having an outer surface in direct contact with an inner end of the retainer, and a shell bearing surface in contact with the support shell, and a washer cooling passage in the washer communicating through the retainer bearing surface and the shell bearing surface.

2. The turbine combustor of claim 1, further comprising a heat shield panel, and wherein the stud extends from the heat shield panel.

3. The turbine combustor of claim 2, further comprising a cooling chamber between the support shell and the heat shield panel.

4. The turbine combustor of claim 3, wherein the cooling passage communicates with the cooling chamber.

5. The turbine combustor of claim 2, wherein the cooling passage directs cooling air to impinge upon the heat shield panel.

6. The turbine combustor of claim 1, wherein the shell bearing surface comprises an arcuate surface.

7. The turbine combustor of claim 6, wherein the outer surface comprises a substantially planar surface.

8. The turbine combustor of claim 1 comprising a protrusion of the washer projecting from the shell bearing surface and into the mounting passage for washer alignment with respect to the support shell.

9. The turbine combustor of claim 8, wherein the washer cooling passage extends through the protrusion.

10. The turbine combustor of claim 1, wherein the support shell further comprises a shell cooling passage, and wherein the washer cooling passage communicates with the shell cooling passage.

11. A support assembly for a turbine engine combustor comprising:
a stud extending through a hot side and a cold side of a support shell;

a retainer attached to the stud on the cold side of the support shell; and a washer circumscribing the stud and disposed between the retainer and the support shell, the washer having an outer surface in direct contact with an inner end of the retainer, the washer having a first surface with a protrusion extending from the first surface, an opposite second surface and a cooling passage communicating through the first and second surfaces.

12. The support assembly of claim 11, wherein the first surface comprises an arcuate surface.

13. The support assembly of claim 12, wherein the second surface is substantially planar.

14. The support assembly of claim 11, wherein the cooling passage extends through the protrusion.

15. The support assembly of claim 11, wherein the retainer is a nut.

16. A turbine engine combustor comprising:
a support shell with an outer side; and
a washer disposed on the outer side of the support shell, the washer comprising:
a first surface;
a second surface facing generally opposite from the first surface;
a bore communicating through the first and second surfaces; and
a cooling passage separate from the bore and communicating through the first and second surfaces.

17. The turbine engine combustor of claim 16, wherein the first surface comprises an arcuate surface.

18. The turbine engine combustor of claim 17, wherein the second surface is substantially planar.

19. The turbine engine combustor of claim 18, wherein the washer body comprises a protrusion projecting outward from the first surface.

20. The turbine engine combustor of claim 19, wherein the cooling passage extends through the protrusion.

* * * * *